United States Patent
Stamires et al.

(10) Patent No.: US 6,716,785 B2
(45) Date of Patent: Apr. 6, 2004

(54) COMPOSITE AND PROCESS FOR THE IN-SITU PREPARATION OF A COMPOSITE COMPRISING A CATIONIC CLAY AND BINDER/MATRIX MATERIAL

(75) Inventors: Dennis Stamires, Newport Beach, CA (US); Paul O'Connor, Hoevelaken (NL)

(73) Assignee: Akzo Nobel NV (NL)

( * ) Notice: Subject to any disclaimer, the term of this patent is extended or adjusted under 35 U.S.C. 154(b) by 0 days.

(21) Appl. No.: 10/259,140

(22) Filed: Sep. 27, 2002

(65) Prior Publication Data

US 2003/0073567 A1 Apr. 17, 2003

Related U.S. Application Data

(63) Continuation-in-part of application No. 09/636,689, filed on Aug. 11, 2000, now abandoned, which is a continuation-in-part of application No. 09/372,293, filed on Aug. 11, 1999, now abandoned.

(51) Int. Cl.[7] ............... B01J 29/06; B01J 21/00; B01J 29/00; B01J 21/16
(52) U.S. Cl. ............... 502/84; 502/63; 502/73; 502/74; 502/80
(58) Field of Search ............... 502/60, 63, 73, 502/74, 80, 84

(56) References Cited

U.S. PATENT DOCUMENTS

| 3,275,493 A | 9/1966 | Mac Dowell | 161/1 |
| 3,666,407 A | 5/1972 | Orlemann | 23/111 |
| 3,844,978 A | 10/1974 | Hickson | 252/455 R |
| 3,844,979 A | 10/1974 | Hickson | 252/455 R |
| 3,926,648 A | 12/1975 | Miller | 106/39.6 |
| 3,959,118 A | 5/1976 | Granquist | 208/120 |
| 4,176,090 A | 11/1979 | Vaughn et al. | 252/455 Z |
| 4,268,311 A | 5/1981 | Ver Dow | 106/45 |
| 4,745,092 A | 5/1988 | Prunier, Jr. | 501/119 |

(List continued on next page.)

FOREIGN PATENT DOCUMENTS

| EP | 0 317 006 | 5/1989 | C01B/33/28 |
| WO | WO 99/20389 | 4/1999 | B01J/21/16 |

*Primary Examiner*—Cam N. Nguyen
(74) *Attorney, Agent, or Firm*—Louis A. Morris

(57) ABSTRACT

A process for the in-situ preparation of a composite comprising a cationic clay and binder/matrix material from sources comprising an aluminum containing source, a silicon containing source and a di-valent metal containing source comprising the steps of:

a. preparing a precursor mixture by mixing the aluminum containing source, the silicon containing source and the di-valent metal containing source with seeding material, b. homogenizing the precursor mixture, and c. aging the precursor mixture to obtain the composite.

One or two of the aluminum containing source, silicon containing source or di-valent metal containing source is to be in excess of the amount required for stoichiometry of the three sources with respect to the formation of the cationic clay. The excess source or sources will form the binder/matrix material of the composite. The invention also includes a body comprising a composite obtained by this process having binding/matrix material present in a discontinuous phase.

52 Claims, 2 Drawing Sheets

Shaped body according to the invention

U.S. PATENT DOCUMENTS

| | | | |
|---|---|---|---|
| 4,774,212 A | 9/1988 | Drezdon | 502/62 |
| 4,861,389 A | 8/1989 | Bryant et al. | 148/3 |
| 4,866,019 A * | 9/1989 | Van Broekhoven | 502/65 |
| 4,946,581 A * | 8/1990 | Van Broekhoven | 208/120 |
| 5,130,280 A | 7/1992 | Dupon et al. | 501/108 |
| 5,202,496 A | 4/1993 | Schutz et al. | 568/388 |
| 5,246,899 A * | 9/1993 | Bhattacharyya | 502/84 |
| 5,407,652 A * | 4/1995 | Swamy et al. | 423/239.1 |
| 5,416,051 A | 5/1995 | Vaughn | 502/84 |
| 5,426,083 A * | 6/1995 | Bhattacharyya et al. | 502/411 |
| 5,472,677 A * | 12/1995 | Farris et al. | 423/239.1 |
| 5,488,021 A | 1/1996 | De Liso et al. | 502/63 |
| 5,498,285 A | 3/1996 | Hooykaas | 16/486 |
| 6,028,023 A * | 2/2000 | Vierheilig | 502/84 |
| 6,057,030 A | 5/2000 | Mano | 428/307.7 |
| 6,284,693 B1 | 9/2001 | Beall et al. | 501/119 |
| 6,376,405 B1 * | 4/2002 | Stamires et al. | 502/73 |
| 6,440,887 B1 * | 8/2002 | Stamires et al. | 502/80 |
| 6,468,488 B1 * | 10/2002 | Stamires et al. | 423/239.1 |
| 6,479,421 B1 * | 11/2002 | Vierheilig | 502/84 |
| 6,534,437 B2 * | 3/2003 | Eijsbouts et al. | 502/313 |

* cited by examiner

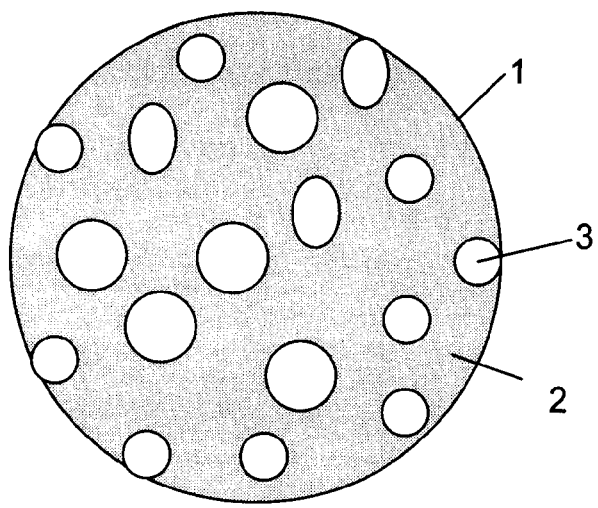
Figure 1. Shaped body according to the invention
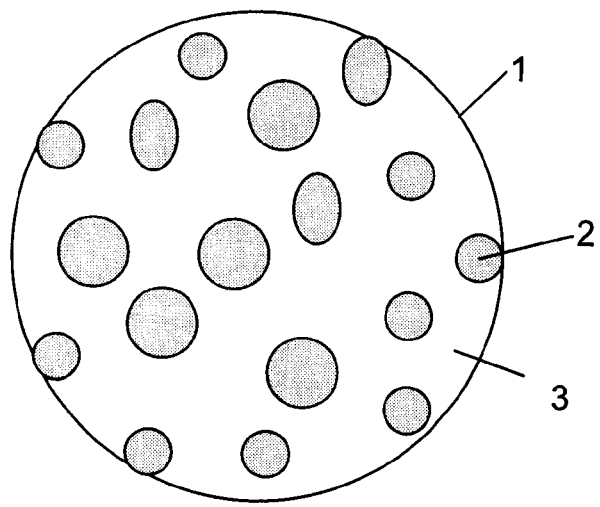
Figure 2. Shaped body according to the prior art

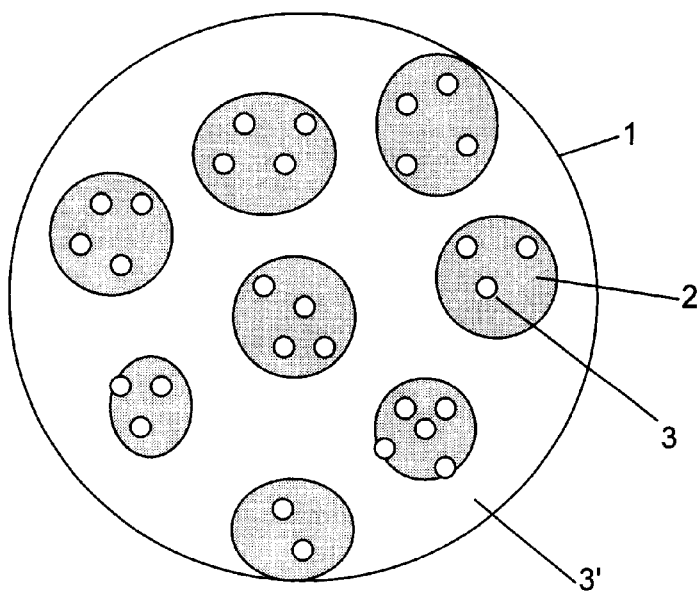
Figure 3. Composite particle comprising shaped bodies according to the invention though silicates of other di-valent metals such as sauconite (Zn), pimelite (Ni), and so on, can also be formed. Laponite, saponite and montmorillonite have been found to be especially suitable for use in sulfur oxides (SOx) reduction additives for FCC processes. Hence, in the description further on reference will usually be made to these preferred clays. However, this should not be construed as limiting the scope of the invention in any way.

COMPOSITE AND PROCESS FOR THE IN-SITU PREPARATION OF A COMPOSITE COMPRISING A CATIONIC CLAY AND BINDER/MATRIX MATERIAL

CROSS REFERENCE TO RELATED APPLICATIONS

This application is a continuation-in-part of U.S. application Ser. No. 09/636,689, filed Aug. 11, 2000 now abandoned, incorporated herein in its entirety, which is a continuation-in-part of U.S. application Ser. No. 09/372, 293, filed Aug. 11, 1999 now abandoned.

BACKGROUND OF THE INVENTION

1. Field of the Invention

The present invention pertains to a composite and process for the in-situ preparation of a composite comprising a cationic clay and binder/matrix material.

2. Description of the Prior Art

Examples of these types of crystalline clays include smectite clays. Smectite clays have several applications in the catalyst field and as absorbents. For most commercial applications crystalline clays are formed into shaped bodies such as spheres, micro-spheres and extrudates. In all these applications where shaped bodies are exposed to severe processing conditions and environments, such as oil refinery applications, separations, purifications, and absorption processes, it is of paramount importance that the integrity of the shaped bodies containing smectite clay is kept intact and attrition is prevented.

In the prior art, crystalline Mg—Al—Si-containing clay is usually incorporated as a physical mixture with binder or matrix material in order to obtain attrition resistant shaped bodies. Commonly used binder/matrix or matrix material is alumina prepared from alumina precursors such as aluminum chlorohydrol, soluble alumina salts, and acid dispersed pseudoboehmite, silica such as silica sols, silicates, silica-alumina cogels, and combinations thereof.

However, when smectite clay is embedded in a matrix, the amount of active crystalline clay ending up in the resulting shaped bodies is relatively small because of dilution of the clay by binder or matrix material. There are applications in which for performance reasons it is desired that the shaped bodies consist or mostly consist of active crystalline clay. Also, by the incorporation of smectite clay into matrix material, physical properties of the crystalline clay such as specific surface area, pore size distribution, etc. may be detrimentally affected. Further, the distribution of the crystalline clay within the matrix is difficult to control, and usually large size aggregates of the individual components exist and prevent the formation of fine homogeneous dispersions. Another disadvantage of having to use a binder/matrix to obtain attrition resistant bodies is the fact that most commonly used binder/matrix materials have some chemical activity, which in certain applications can cause undesirable side reactions. For instance, the one of the most commonly used binder material in FCC catalysts and additives is silica or silica based material. These types of binders are not suitable for use in sulfur oxides removal additives, because they detrimentally affect the sulfur removal.

SUMMARY OF THE INVENTION

In one embodiment, the present invention is directed to a process for the in-situ preparation of a composite comprising a cationic clay and binder/matrix material from sources comprising an aluminum containing source, a silicon containing source and a di-valent metal containing source comprising the steps of:

a) preparing a precursor mixture by mixing the aluminum containing source, the silicon containing source and the di-valent metal containing source with seeding material, b) homogenizing the precursor mixture, and c) aging the precursor mixture to obtain the composite.
One or two of the aluminum containing source, silicon containing source or di-valent metal containing source is to be in excess of the amount required for stoichiometry of the three sources with respect to the formation of the cationic clay. The excess source or sources will form the binder/matrix material of the composite.

In a second embodiment, the present invention comprises a body comprising a crystalline clay comprising divalent metal-Al—Si wherein any binding material is present in a discontinuous phase.

Other embodiments of our invention encompass details about compositions, manufacturing steps, etc., all of which are hereinafter disclosed in the following discussion of each of the facets of the present invention.

BRIEF DESCRIPTION OF THE DRAWINGS

FIG. 1: Schematic view of a shaped body according to the invention

FIG. 2: Schematic view of a shaped body according to the prior art

FIG. 3: Schematic view of a composite particle comprising shaped bodies according to the invention

DETAILED DESCRIPTION OF THE INVENTION

The present invention provides composites containing crystalline divalent metal-Al—Si-containing clay and shaped bodies thereof that are attrition resistant without high amounts of binder/matrix having to be present. The amount of crystalline clay and its distribution within the composites of the invention can easily be controlled as will be explained further in the description. Within the context of the present specification, the term "crystalline clay" means clay that gives an X-ray diffraction pattern characteristic for the specific type of synthetic clay.

The essence of the present invention is that composites comprising crystalline divalent metal-Al—Si-containing clay and binder/matrix are formed in situ. The term "binder/matrix" is employed herein to indicate that the non-clay part of the composite may function as a true binder such as when imparting attrition resistant properties to the composite, or may simply be a matrix to the composite that may not contribute substantially to attrition resistance. In either case, however, whether binder or matrix, the in-situ formation of the composite results in an intimate contact and interface between the clay and binder/matrix not realized with a physical mixture typical of prior art composites, which has a profound affect on the composite catalytic activity, porosity, surface area, etc.

The di-valent metal may comprise one or more of Ca, Mg, Zn, Ni, Cu, Co, and/or Fe. In a preferred embodiment, the composite of the invention is formed from an aluminum source, a magnesium source for the di-valent metal, and, a silicon source, usually resulting in the formation of smectite clay, such as laponite, saponite or montmorillonite as the clay portion of the composite.

Suitable alumina sources include aluminum oxides and hydroxides such as transition alumina, aluminum trihydrate (gibbsite, bayerite) and its thermally treated forms, including flash calcined alumina, flash calcined gibbsite, flash calcined BOC, sols, amorphous alumina, (pseudo)boehmite, aluminum-containing clays such as kaolin, sepiolite, hydrotalcite, and bentonite, modified clays such as metakaolin, alumina salts such as aluminum nitrate, aluminum chloride, aluminum sulfate, aluminum chlorohydrate, sodium aluminate. With the process according to the invention it is also possible to use cruder grades of aluminum trihydrate such as BOC (Bauxite Ore Concentrate) or bauxite. When clays are used as an Al-source, it may be necessary to activate the alumina in the clay by acid or base treatment, (hydro)thermal treatment, or combinations thereof, etcetera. Acid treatment comprises treatment with nitric acid, acetic acid, formic acid, phosphoric acid, sulfuric acid, hydrochloric acid, etc. Thermal treatment is usually performed at temperatures ranging from 30–1000° C., preferably 200–800° C., for a time ranging from several minutes to 24 hours, preferably 1–10 hours.

Preferred aluminum containing sources may be selected from the group consisting of aluminum trihydrate or its thermally treated form, flash calcined gibbsite, flash calcined BOC, flash calcined aluminum trihydrate, (pseudo) boehmite, an amorphous alumina gel, kaolin, calcined kaolin, bauxite, delaminated kaolin and acid or based leached kaolin, or mixtures thereof. The aluminum containing source and the silicon containing source may both be provided by silica-alumina co-gel.

Most preferred alumina sources comprise gibbsite, flash calcined gibbsite, flash calcined BOC, or mixtures thereof, a mixture of gibbsite and flash calcined gibbsite, a mixture of gibbsite and flash calcined BOC a mixture of gibbsite and BOC, a mixture of BOC and boehmite, a mixture of bauxite and flash calcined gibbsite and a mixture of flash calcined BOC and BOC.

Preferred silicon containing sources comprise compounds containing silica selected from the group consisting of silica sol, silica gel, sodium silicate and sodium meta-silicate, or mixtures thereof.

Suitable magnesium sources, when Mg is used as the di-valent metal, include magnesium oxides or hydroxides such as MgO, $Mg(OH)_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, sepiolite. Also mixtures of the above-mentioned magnesium sources can be used, and the different magnesium sources can be combined in the precursor mixture in any sequence.

Preferred magnesium sources are magnesium oxide, carbonate, magnesium hydroxide, magnesium hydroxycarbonate, magnesium carbonate, magnesium salts, magnesium hydroxy carbonate, magnesium hydroxide and hydromagnasite or mixtures thereof.

Seeding Materials

The use of seeding material is essential to the invention. Seeding material is selected to enhance the in situ formation of the clay and binder/matrix material. Two or more different types of seeding materials may be employed, one or more types to enhance the formation of clay and one or more of the other types to enhance the formation of binder/matrix material.

The seeding material may be one or more of the materials selected from the group consisting of sodium aluminate, aluminum sulfate, aluminum nitrate, ammonium sulfate, aluminum phosphate, aluminum hydrols, amorphous alumina, flash calcined gibbsite, alumina sol or gel, titania, zirconia, magnesium silicate, sodium silicate, sodium meta-silicate, pseudoboehmite, microcrystalline alumina, silica-alumina, titania-alumina, zirconia-alumina, aluminum phosphate, sodium phosphate, sodium pyrophosphate, ammonium phosphate, metal salts, phosphate salts, hydroxides and oxides, natural and synthetic clays including smectites, bentonites, montmorillonites, hectorites, saponites, laponites, urea, and mixtures thereof.

The amount of seeding material in the precursor mixture is preferably from about 0.5 wt. % to about 10 wt. % on the basis of dry solids.

It is preferred that the average particle sizes of each of the aluminum containing source, the silicon containing source and the di-valent metal containing source are not greater than about 30 microns. The average particle size of the seeding material should be less than the smallest average particle size of the aluminum containing source, the silicon containing source and the di-valent metal containing source. The average particle size of the seeding material is preferably less than about 20 microns.

The relative amounts or mole ratios of the various sources in the precursor mixture are chosen on the basis of the desired binder/matrix material for the composite. Whatever is in excess of the stoichiometric amount required to make the clay component of the composite will comprise binder/matrix material. If only one source is in excess, the excess of that source will become binder/matrix material. If two sources are in excess, the binder/matrix material will comprise a combination of the excess of those sources.

The various process steps will be described in more detail below.

Preparation of the Precursor Mixture

A precursor mixture is prepared from the aluminum containing source, the silicon containing source and the di-valent metal containing source. All liquids are suitable, as long as they do not detrimentally interfere with the various sources. Suitable liquids are water, ethanol, propanol, etc. The amount of liquid will be as needed for shaping. If more than one source is used for each component of the precursor mixture, the sources can be added as solids, but they can also be added in liquid. The various sources can be added in any sequence. The preparation of the precursor mixture may be carried out with stirring at room temperature or elevated temperature.

The precursor mixture is homogenized by, for instance, milling or high shear mixing. The tern "milling" is defined as any method that results in reduction of particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as milling.

Shaping

A shaping of the precursor may optionally be carried out either prior to or after aging to obtain shaped bodies. Suitable shaping methods include spray-drying, pelletising, extrusion (optionally combined with kneading), beading (spherizing), or any other conventional shaping method used in the catalyst and absorbent fields or combinations thereof. The amount of liquid present in the precursor mixture used for shaping should be adapted to the specific shaping step to be conducted. It might be advisable to (partially) remove the liquid used in the precursor mixture and/or add additional or other liquid, and/or change the pH of the precursor mixture to make the precursor mixture gellable and thus suitable for shaping. Various additives commonly used in the various-shaping methods such as extrusion additives may be added to the precursor mixture used for shaping.

If desired, organic or inorganic acids and bases, for example for control of the pH, may be added to the precursor mixture or added to any one of the aluminum source, di-valent metal source and/or silicon source before these are added to the precursor mixture. An example of a preferred pH modifier is an ammonium base, because upon drying no deleterious cations remain in the clay.

Aging

In this step, the precursors of the composites of the invention, which may comprise slurries, shaped bodies or other forms, are aged, during which time the desired degree of crystallization to crystalline clay takes place, as well as the conversion of the source of alumina to binder/matrix material. Aging may be carried out at a temperature from about 100° C. to 300° C. for a time from 0.5 hour to about 100 hours and under a pressure from atmospheric to an autogeneous pressure at temperatures above about 100° C. Aging may also be hydrothermal which may be carried out at a temperature from about 120° C. to 200° C. for a time from about 0.5 hours to about 50 hours and under atmospheric pressure up to about 100° C., or, when the temperatures is above about 100° C., whatever pressure under air or other atmosphere, such as $CO_2$, is sufficient to maintain liquid phase.

Hydrothermal aging involves immersing the composite precursor in a protic liquid or a protic gaseous medium. Suitable protic aging liquids or gaseous media are those liquids and gaseous media in which the shaped bodies do not dissolve, such as water, ethanol, methanol, propanol, steam, gaseous water, gaseous ethanol, etc. Increasing the temperature of the liquid and/or the pressure can reduce the aging time.

For some purposes it is advantageous to conduct one or more pre-aging steps. The time, temperature and pH of the pre-aging step(s) may be the same or different from each other and from the final aging step. Additives and/or seeding material may be added to the precursor mixture during one or more of the pre-aging steps.

The shaped mixture may be dried and calcined. Either prior to or after aging, including after a shaped mixture is dried and calcined, shaped bodies may be milled to obtain fine particles that are re-shaped with the addition of additives. A calcined, shaped mixture may impregnated with a solution of one or more metal salts comprising additives and may be dried and/or calcined again.

Optionally there may be intermediate drying steps between aging steps, optionally followed by calcination steps. For instance, an aging step with a temperature below 100° C. may be followed by a hydrothermal aging step at a temperature above 100° C. and autogeneous pressure, or vice versa. As will be described below in further detail, additives can be added before, after or during any aging step.

The process according to the invention may be conducted batch-wise or in a continuous mode, optionally in a continuous multi-step operation. The process may also be conducted partly continuous and partly batch-wise.

Additives

For some applications it is desirable to have additives present in the precursor mixture (and/or on the shaped bodies) of the invention, both metals and non-metals, such as rare earth metals (e.g. Ce and La), Si, P, B, Group VI metals, Group VIII metals, noble metals such as Pt and Pd, alkaline earth metals (for instance Mg, Ca and Ba) and/or transition metals (for example Mn, Fe, Ti, W, V, Zr, Cu, Co, Ni, Zn, Mo, Sn). Such metals and non-metals can be added separately or in mixtures in any of the preparation steps of the invention. For instance, they can easily be deposited on shaped bodies before, during, or after aging, or else they can be added to the precursor mixture before aging. Suitable sources of metals or non-metals are oxides, hydroxides, halides or any other salt, such as chlorides, sulfates, such as ammonium sulfate and sodium sulfate, nitrates, phosphates, such as ammonium phosphate, sodium phosphate, sodium pyrophosphate, borates, tungstates, molybdates, silicates, such as sodium silicate, sodium meta silicate, etc. As mentioned above, the metals and non-metals may be added in any of the preparation steps. This can be especially advantageous for controlling the distribution of the metals and non-metals in the composites. It is even possible to calcine the shaped bodies, re-hydrate them and add additional additives. Other additives, such as pore regulating agents, sugars, polymers, carbon black, gum and starches may also be added.

Preferred additives are selected from the group consisting of compounds containing W, V, Fe, Cu, P, Si, B, Co, Ni, Zn, Mo, Ce, La, Pt, Pd, or mixtures thereof.

Additives may be added by impregnating a calcined shaped mixture with a solution of one or more metal salts, or by doping (providing a uniform distribution of dopant within host material) one or more of the ingredients of the mixture with metal additives, or by incorporating additives in the mixture before aging or before shaping and aging.

If desired, additives could also be added to the composites of the invention by subjecting the composites to ion exchange to change the chemical and physical properties of the clay. The ion exchange can be conducted as soon as the crystalline clay has been formed. Suitable ion exchange compounds include any metal cation compound containing Cu, Al, W, Mo, Fe, Co, Ce, V, Mg, Zn, pillaring cations such as aluminum chlorohydrol, transition metals e.g. Ni, rare earth metals, alkaline earth metals, etc.

With the help of additives the composites of the invention may be provided with desired catalytic functionalities, such as hydroprocessing including hydrodesulfurization or hydrodenitrogenation, hydrodemetalization, or the desired functionality may be increased by the addition of additives. The suitability of the composites for metal trapping in FCC may be improved by the addition of La. The presence of V, Zn, Ce, W and Fe also improves the suitability for removal of sulfur and nitrogen compounds in the gasoline and diesel fraction of FCC. Also, the presence of V, Ce, Zn, Cu and Fe enhance the removal of SOx and NOx from stationary sources emitting such noxious gasses, e.g. FCC units and power plants.

In addition, acids and bases may be included with the above additives and mixtures of the additives, acids and bases may be used.

Composition of the Invention

The present invention is further directed to the composites obtainable by the process of the invention. The binder/matrix that is present in the composites of the invention are present as a discontinuous phase, as is depicted schematically in FIG. 1. This is in contrast to clay/matrix composites prepared in the conventional way, i.e. by embedding clay as a physical mixture into a matrix or binder/matrix material, where the binder/matrix material in the bodies is present in a continuous phase, as is schematically depicted in FIG. 2.

A preferred composition comprising the composite of the invention includes a binder/matrix material comprising alumina material containing boehmite. The boehmite may comprise from about 5 wt. % to about 95 wt. % of the composite. The composite may contain cationic clay that comprises from about 95 wt. % to about 5 wt. % of the body. The composite may also comprise additives.

The composites of the invention may contain additives selected from the group of zeolites comprising small pore pentasil, Y zeolite, rare earth exchanged USY zeolite, USY zeolite, ZSM zeolite, beta zeolite, and mixtures thereof.

The composites of the invention may be in the form of shaped bodies which may also include additives.

The composites or shaped bodies of the invention may be incorporated into a matrix. Matrixes comprising one or more inorganic oxides would be typical. In that case, particles are obtained which comprise the composites or shaped bodies of the invention embedded in a binder/matrix material, as is schematically depicted in FIG. 3, that may include binders, extenders, fillers, catalyst support material, clays, zeolites, etc. known to the art.

In FIG. 1 a schematic view is given of a shaped composite (1) of the present invention which comprises crystalline clay (2) and binder/matrix material (3) in a discontinuous phase.

In FIG. 2 a schematic view is given of a shaped crystalline clay-containing body (1) according to the prior art which comprises crystalline clay (2) and binder/matrix material (3) in a continuous phase.

In FIG. 3 a schematic view is given of a particle comprising composites of the invention (1) which comprise crystalline clay (2) and binder/matrix material (3) in a discontinuous phase which are embedded in binder/matrix material (3) which is in a continuous phase.

EXAMPLES

The following non-limiting examples are presented to first illustrate (Examples 1–7) the making of clays that can be made with different precursors in stoichiometric amounts and then (Examples 8–21) illustrate various embodiments of the present invention, where one or more precursors are in excess and binder/matrixes are formed in addition to the clays:

Example 1

A synthetic Saponite (Smectite clay) was prepared using solutions of Sodium Silicate, Aluminum Nitrate and Magnesium Nitrate, according to the procedures known in the State of the Art. Specifically three separate solutions were prepared. Solution (a) contained 67 grams of water and 13 grams of Sodium Silicate (28% $SiO_2$); Solution (b) contained about 26 grams of 2 molar Sodium Hydroxide solution and 4 grams of $AL(NO_3)_3.9H_2O$; Solution (c) contained 167 grams of water, 12 grams of Urea (seeding material) and 13 grams of $Mg(NO_3)_2.6H_2O$. Solution (b) was added to Solution (a) with stirring over 30 minutes at room temperature and with the addition of 335 grams of water to achieve homogenization, followed with the addition of Solution (c) over 30 minutes at 90° C., and aged for 18 hours. Subsequently clay was filtered, washed and dried at 85° C. XRD analysis indicated product was a Saponite clay.

Example 2

Example 1 was repeated except that the Aluminum Nitrate used in Solution (b) was replaced with Flash Calcined Gibbsite (Alcoa's Cp1.5 grade); the rest of the processing was the same. The Flash Calcined Gibbsite functioned both as seed and reactant.

XRD analysis indicated product was a well formed Saponite Smectite clay.

Example 3

Example 1 was repeated except that the Aluminum Nitrate [Solution (b)] was replaced with the Flash Calcined Gibbsite, and the Magnesium Nitrate [Solution (c)] was replaced with 16 grams of $Zn(NO_3)_2.6HO_2$); the rest of the processing was the same.

XRD analysis indicated that the product comprised a Zinc containing Saponite (Smectite).

Example 4

Example 1 was repeated except that the Aluminum Nitrate used in Solution (b) was replaced with an excess of fine particle-size Gibbsite and the final aging was done at 150° C. for 18 hours. The product according to XRD analysis was a synthetic Saponite Smectite.

Example 5

Example 1 was repeated except that the Aluminum Nitrate was replaced with fine particle Gibbsite and the Magnesium Nitrate was replaced with 15 grams of $Ni(No_3)_2.6HO_2$); the rest of the processing was the same.

XRD analysis indicated product was a Nickel containing Saponite Smectite.

Example 6

Examples 3, 4 and 5 were repeated except that they did not contain Urea; the rest of the processing was the same. XRD analysis indicated products in all three examples were Saponites Smectite clays albeit the yield of clay was comparatively less because seeding material (Urea) was not employed.

Example 7

Examples 2 and 5 were repeated except the Alumina source used in the slurry was a mixture of Gibbsite and Flash Calcined Gibbsite mixed in the ratio by weight of 75:25 respectively, and the aging was done at 185° C. for two hours. The slurries, were milled with a colloidal type of mill before being aged. The product according to XRD analysis was a synthetic Saponite Smectite in an amount that indicated relatively high conversion. This illustrates that more than one alumina source may be used and that homogenization, in this case by milling, accelerates the reaction (only two hours were required) and improves conversion.

Example 8

Example 2 was repeated except that the amount of Sodium Silicate and Magnesium Nitrate was reduced proportionally by 50%, the rest of the processing was the same. XRD analysis indicated the product was a composite consisting of quasi-crystalline Boehmite and a small amount of Smectite clay. This example and the following examples illustrate the present invention in that composites comprising clay and discontinuous binder/matrix material are formed.

Example 9

Example 8 was repeated except that no Urea was used and slurry was aged at 185° C for four hours. XRD analysis indicated product was a composite consisting of microcrystalline Boehmite and a small amount of Smectite clay. The only seeding material in this example was Flash Calcined Gibbsite that functioned both as a seeding material and a reactant.

Example 10

Example 7 was repeated except only about 10% of the Silica and Magnesia required to form the clay was used, the amount of Alumina was kept the same. The rest of the processing was the same. XRD analysis indicated that the product was a composite containing mostly quasi-crystalline Boehmite and a small amount of synthetic clay.

Example 11

Example 10 was repeated except that the Magnesium. component was replaced with Magnesium Sulfate; the rest of the processing was the same. XRD analysis indicated that the product was a composite similar to that obtained in Example 10.

Example 12

Example 10 was repeated except that the Magnesium component was replaced with Nickel Nitrate; the rest of the processing was the same. According to XRD analysis, the product was a composite consisting of quasi-crystalline Boehmite and synthetic Smectite clay. This illustrates that di-valent metals other than magnesium may be employed.

Example 13

Example 10 was repeated except that the Alumina source was a mixture of fine particle Gibbsite and Catapal® Alumina (a commercial boehmite) mixed into a ratio by weight (as $Al_2O_3$) of 80 to 20 respectively and used as a seed. The rest of the processing was the same. The product, according to XRD, was a composite consisting mostly of quasi-crystalline Boehmite and a small amount of synthetic clay.

Example 14

Example 12 and 13 after aging were divided into two portions each. One portion was concentrated and extruded into pellets, the other portion was formed into spheres; subsequently, formed shaped bodies were dried and calcined. This illustrates the forming of the composites of the invention into various shapes.

Example 15

Example 11 was prepared in a much larger scale and slurry after aging was spray dried, except before spray drying 6% by weight of Cerium Nitrate (on a dry basis) was added. Formed microspheres were divided into two portions; one portion was impregnated with Vanadium, and the other impregnated with Tungsten, subsequently dried and calcined. Samples were then used in FCC evaluation unit for SOX, NOX reduction as well as lowering of the Sulfur in the gasoline.

Example 16

Example 10 was repeated except to the slurry containing the reactants 3% by weight of a synthetic clay (on a dry basis) was used as seed to enhance the conversion; the rest of the processing was the same. The product, according to XRD analysis, was a composite mostly consisting of quasi-crystalline Boehmite and a small amount of synthetic clay.

Example 17

Example 10 was repeated except in aging slurry 8% by weight of Ammonium Molybdate (on a dry basis) was added. The rest of the processing was the same.

Example 18

Example 10 was repeated except in the aging slurry 5% by weight of Cobalt Nitrate and 7% by weight of Ammonium Molybdate (on a dry basis) were added. The rest of the processing was the same. Product, a Boehmite containing a small amount of synthetic clay all doped with Co and Mo metals was formed into extrudates, which were calcined and tested in the hydroprocessing test unit for HDS, and HDN, hydrodesulfurization, hydrodenitrogenation and hydrodemetalization activities.

Example 19

Example 10 was repeated except that 2 wt. % (as $P_2O_5$) of ammonium phosphate was added to the slurry before aging. The rest of the processing was the same.

Example 20

Example 10 was repeated except that 1.5 wt. % (as $P_2O_5$) of sodium pyrophosphate was added to the slurry before aging. The rest of the processing was the same.

Example 21

Example 16 was repeated except that 2 wt. % (as $P_2O_5$) of sodium pyrophosphate was added to the slurry before aging. XRD analysis indicated product consisting of psudo-crystalline boehmite and a small amount of clay.

With regard to all of Examples 8–21, XRD analysis of the resulting composites showed the binder/matrix material to be in discontinuous phase with respect to the clay.

What is claimed is:

1. Process for the in-situ preparation of a composite comprising a cationic clay and binder/matrix material from sources comprising an aluminum containing source, a silicon containing source and a di-valent metal containing source comprising the steps of:
    a) preparing a precursor mixture by mixing said aluminum containing source, said silicon containing source and said di-valent metal containing source with seeding material to promote the formation of said clay,
    b) homogenizing said precursor mixture, and
    c) aging said precursor mixture to obtain said composite, wherein one or two of said aluminum containing source, silicon containing source and di-valent metal containing source is in excess of the amount required for stoichiometry of the three sources with respect to the formation of said cationic clay.

2. The process of claim 1 wherein said di-valent metal is selected from the group consisting of Mg, Ca, Zn, Ni, Cu, Co, Fe, and mixtures thereof.

3. The process of claim 1 wherein in step a) an aluminum source, a magnesium source, a silicon source and seeding material are combined to obtain a precursor mixture.

4. The process of claim 3 wherein the magnesium source comprises magnesium oxide, magnesium carbonate, magnesium hydroxy carbonate, magnesium hydroxide or hydromagnasite.

5. The process of claim 1 wherein said seeding material is one or more selected from the group consisting of sodium aluminate, aluminum sulfate, aluminum nitrate, ammonium sulfate, aluminum phosphate, aluminum hydrols, amorphous alumina, flash calcined gibbsite, alumina sol or gel, titania, zirconia, magnesium silicate, sodium silicate, sodium meta-silicate, pseudo boehmite, microcrystalline alumina, silica-alumina, titania-alumina, zirconia-alumina, aluminum phosphate, sodium phosphate, sodium pyrophosphate, ammonium phosphate, metal salts, phosphate salts, hydroxides and oxides, natural and synthetic clays including smectites, bentonites, montmorillonite, hectorites, saponites, laponites, urea and mixtures thereof.

6. The process of claim 1 wherein at least two different seeding materials are employed, one to enhance the formation of clay and the other to enhance the formation of binder/matrix material.

7. The process of claim 1 wherein the amount of seeding material in said precursor mixture is from about 0.5 wt. % to about 10 wt. % on the basis of dry solids.

8. The process of claim 1 wherein the average particle sizes of each of said aluminum containing source, said silicon containing source and said divalent metal containing source are not greater than about 15 microns.

9. The process of claim 1 wherein the average particle size of said seeding material is less than the smallest average particle size of said aluminum containing source, said silicon containing source and said divalent metal containing source.

10. The process of claim 1 wherein the average particle size of said seeding material is less than about 15 microns.

11. The process of claim 1 wherein the precursor mixture is homogenized in step b) by milling.

12. The process of claim 1 wherein said precursor mixture is shaped prior to or after aging to obtain shaped bodies.

13. The process of claim 12 wherein said shaped bodies are milled to obtain fine particles that are re-shaped with the addition of additives.

14. The process of claim 12 wherein said precursor mixture is shaped after aging to obtain shaped bodies.

15. The process of claim 12 wherein the shaped bodies may be provided with desired functionalities by addition of appropriate additives.

16. The process of claim 12 wherein said shaping comprises spray drying, extrusion, pelletizing, or sphereizing.

17. The process of claim 12 wherein the shaped mixture is dried and calcined.

18. The process of claim 17 wherein said shaped bodies are milled to obtain fine particles that are re-shaped with the addition of additives.

19. The process of claim 17 wherein the calcined shaped mixture is impregnated with a solution of one or more metal salts comprising said additives.

20. The process of claim 12 wherein additives are incorporated into the mixture before shaping and aging.

21. The process of claim 1 wherein the aluminum source comprises aluminum trihydrate or its thermally treated form.

22. The process of claim 1 wherein the aluminum source comprises flash calcined gibbsite, flash calcined BOC, or both.

23. The process of claim 1 wherein the aluminum source comprises (pseudo)boehmite.

24. The process of claim 1 wherein the aluminum source comprises an aluminum salt.

25. The process of claim 1 wherein the aluminum source comprises an amorphous alumina gel.

26. The process of claim 1 wherein the aluminum source comprises kaolin, bauxite, gibbsite, or mixtures thereof.

27. The process of claim 1 wherein the aluminum source comprises a mixture of gibbsite and flash calcined gibbsite, or a mixture of bauxite and flash calcined gibbsite.

28. The process of claim 1 wherein the aluminum source comprises a mixture of gibbsite and flash calcined BOC, a mixture of gibbsite and BOC, a mixture of BOC and boehmite or a mixture of flash calcined BOC and BOC.

29. The process of claim 1 wherein additives are added to the precursor mixture before or after aging.

30. The process of claim 29 wherein said additives are selected from the group consisting of compounds containing W, V, Fe, Cu, P, Si, B, Co, Ni, Zn, Mo, Ce, La, Pt, Pd, pore regulating agents, sugars, polymers, carbon black, gum, starches, and mixtures thereof.

31. The process of claim 29 wherein said composite is ion exchanged following formation of said clay with an ion exchange compound selected from the group consisting of compounds containing Cu, Al, W, Mo, Ce, V, Fe, Co, Mg, Zn, Ni, pillaring cations, transition metals, rare earth metals, alkaline earth metals and mixtures thereof.-.

32. The process of claim 29 wherein one or more of said aluminum containing source, said silicon containing source, said di-valent metal containing source and said seeding material of said precursor mixture have been doped with metal additives.

33. The process of claim 1 wherein aging is carried out at a temperature from about 100° C. to 300° C. for a time from 0.5 hour to about 100 hours and under a pressure from atmospheric to an autogeneous pressure at temperatures above 100° C.

34. The process of claim 33 wherein one or more pre-aging steps are carried out prior to said aging step with the time, temperature and pH of the pre-aging step(s) being the same or different from each other and from the aging step.

35. The process of claim 34 wherein additives and/or seeding material may be added to the precursor mixture during one or more pre-aging steps.

36. The process of claim 1 wherein hydrothermal aging is carried out at a temperature from about 120° C. to 200° C. for a time from about 0.5 hours to about 50 hours and under a pressure from atmospheric to an autogeneous pressure at temperatures above 100° C.

37. The process of claim 1 conducted batch-wise, continuous or partly continuous and partly batch-wise.

38. The process of claim 1 conducted in a continuous multi-step operation.

39. The process of claim 1 wherein said composite is incorporated into an inorganic oxide matrix.

40. A composite obtained in situ by the process of claim 1, wherein the binding/matrix material present in the composite is present in a discontinuous phase.

41. The composite of claim 40 wherein said binder/matrix material is boehmite that comprises from about 5 wt. % to about 95 wt. % of said composite.

42. The composite of claim 40 wherein the cationic clay comprises from about 95 wt. % to about 5 wt. % of said composite.

43. The process of claim 40 wherein said binder/matrix is alumina material containing boehmite.

44. The composite of claim 40 comprising additives.

45. The composite of claim 44 wherein said additives are selected from the group consisting of W, V, Fe, Cu, P, Si, B, Co, Ni, Zn, Mo, Ce, La, Pt, Pd and mixtures thereof.

46. The composite of claim 40 wherein the clay in said composite comprises zeolite selected from the group consisting of small pore pentasil, Y zeolite, rare earth exchanged USY zeolite, USY zeolite, ZSM zeolite, beta zeolite, and mixtures thereof.

47. The composite of claim 46 formed into a shaped body.

48. The shaped body of claim 47 comprising additives.

49. The composite of claim 40 that is embedded in a binder or matrix material, or both.

50. The composite of claim 49 wherein said binder or matrix material comprises extenders, fillers and catalyst support material.

51. The composite of claim 40 formed into a shaped body.

52. The shaped body of claim 51 comprising additives.

* * * * *